United States Patent
Walley et al.

(10) Patent No.: US 6,813,505 B2
(45) Date of Patent: Nov. 2, 2004

(54) EFFICIENT AND FLEXIBLE COMMUNICATION DEVICE AND SYSTEM WITH BASE-TO-BASE COMMUNICATION

(75) Inventors: John S. Walley, Ladera Ranch, CA (US); Kenneth E. Garey, Irvine, CA (US); Doug M. Berger, Las Flores, CA (US)

(73) Assignee: Skyworks Solutions, Inc., Irvine, CA (US)

( * ) Notice: Subject to any disclaimer, the term of this patent is extended or adjusted under 35 U.S.C. 154(b) by 473 days.

(21) Appl. No.: 09/756,039

(22) Filed: Jan. 5, 2001

(65) Prior Publication Data

US 2002/0090961 A1 Jul. 11, 2002

(51) Int. Cl.$^7$ .................................................. H04Q 7/20
(52) U.S. Cl. ........................................................ 455/464
(58) Field of Search ................................ 455/462, 524, 455/561, 420, 447, 464; 375/132; 359/159

(56) References Cited

U.S. PATENT DOCUMENTS

| | | | | |
|---|---|---|---|---|
| 3,745,462 A | * | 7/1973 | Trimble | |
| 4,284,848 A | * | 8/1981 | Frost | |
| 4,881,259 A | * | 11/1989 | Scordato | |
| 5,133,001 A | * | 7/1992 | Bohm | ............... 455/464 |
| 5,265,150 A | * | 11/1993 | Helmkamp et al. | |
| 5,384,826 A | * | 1/1995 | Amitay | |
| 5,430,789 A | * | 7/1995 | Ohgami | |
| 5,537,594 A | * | 7/1996 | Shannon et al. | |
| 5,594,782 A | * | 1/1997 | Zicker et al. | |
| 5,666,355 A | * | 9/1997 | Huah et al. | |
| 5,749,053 A | * | 5/1998 | Kusaki et al. | ............... 455/524 |
| 5,771,468 A | * | 6/1998 | Stein | ........................... 455/561 |
| 5,802,467 A | * | 9/1998 | Salazar et al. | ............... 455/420 |
| 6,151,352 A | * | 11/2000 | Taki et al. | .................... 375/132 |
| 6,175,737 B1 | * | 1/2001 | Kao | ........................... 455/447 |
| 6,323,980 B1 | * | 11/2001 | Bloom | ........................ 359/159 |

FOREIGN PATENT DOCUMENTS

GB          2246052          *  1/1992

* cited by examiner

Primary Examiner—William Cumming
(74) Attorney, Agent, or Firm—Farjami & Farjami LLP

(57) ABSTRACT

A communication device that includes a base. The base includes a line interface for receiving incoming communications over a network line and sending outgoing communications over the network line, a communication transceiver for interfacing the communication device over a communication link to other communication devices in a same in-home network and for interfacing other communication devices in the same in-home network to the line interface via the communication link, and a storage medium for storing communication software that allows the communication device to communicate with other communication devices through the transceiver. The communication device also includes a processor coupled to the storage medium and to the line interface. The processor is configured to run the communication software and to receive incoming communications through the line interface and to send an outgoing communications through the line interface. The communication transceiver can be a RF short range transceiver.

21 Claims, 11 Drawing Sheets

EFFICIENT AND FLEXIBLE COMMUNICATION DEVICE AND SYSTEM WITH BASE-TO-BASE COMMUNICATION

BACKGROUND OF THE INVENTION

1. Field of the Invention

The present invention relates generally to cordless telephone systems and, more particularly, relates to a system and method for telephonic communication that involves base-to-base communication.

2. Background of the Invention

In the United States, homes often have access to two or more telephone lines and several telephones. Often these phones are cordless phones comprised of a base and a handset. It is desirable for each handset to answer calls on any telephone line coming into the home, so as to eliminate the need to determine on which line the call is coming in and the need to search for the correct handset. Additionally, owners of multiple cordless phones find it desirable for the handsets to communicate with each other without tying up a telephone line.

There are several current approaches to solving these problems. First, two-line phones provide access to two different telephone lines by including two separate network line interface circuits and the appropriate switching hardware to switch from line to line. Additionally, there are cordless telephone standards that provide for multi-channel link systems that allow a single base to handle multiple handsets and allow handsets to use multiple bases. A base in such a network can have two line interfaces as discussed above and, therefore, each handset in the network can answer either line. One example system conforms to the Digital Enhanced Cordless Telephone (DECT) standard, which is promulgated by the European Telecommunications Standards Institute (ETSI). The DECT standard is compatible with GSM or ISDN networks. Another example system, used in Japan, is the Personal Handy-Phone System (PHS).

One problem with these current approaches is that they are bandwidth intensive. This can be a problem in North America, for example, where cordless telephone systems commonly use the 900 MHz-ISM band, which has limited bandwidth available for incorporating these types of features. Further, these systems tend to increase the complexity of the handset design, making the handsets more expensive and reducing battery life. Reduced battery life leads to lower standby and talk times. Another problem with current systems is inflexibility. Once a system is installed, a whole new system may need to be purchased if new features are to be added, or if the user wants to take advantage of new technological developments.

SUMMARY OF THE INVENTION

In view of these drawbacks, the systems and methods for telephonic communication involve base-to-base communication. Base-to-base communication makes building an in-home network in which any handset can answer calls on any network line easy and cost efficient. The bases are connected in a network configuration so that they can share resources and enable functional integration of multiple phone lines, handsets, answering machines, and computer devices.

As a result, in accordance with the systems and methods for telephonic communication there is provided a communication device that includes a base. The base includes a line interface configured to receive incoming communications over a network line and to send outgoing communications over the network line, a communication transceiver configured to interface the communication device over a communication link to other communication devices in a same in-home network and to interface other communication devices in the same in-home network to the line interface via the communication link, and a storage medium configured to store communication software that allows the communication device to communicate with other communication devices through the transceiver. The communication device also includes a processor communicatively coupled to the storage medium and to the line interface. The processor is configured to run the communication software and to receive an incoming communication through the line interface and send an outgoing communication through the line interface.

In one preferred embodiment, the communication transceiver is a RF short range transceiver.

In one embodiment, the communication device includes a remote terminal, such as a handset. The handset typically includes a speaker and a microphone configured to play and generate audio signals, which are communicated back and forth with the base over a RF communication channel. Therefore, the base includes a second communication transceiver for communicating with the remote terminal. A key feature of the systems and methods for telephonic communication is that the remote terminal is never interfaced to more than one base at any given time. In other embodiments, the base can be part of a speaker phone or answering machine.

There is also provided an In-home network comprised of a plurality of devices such as those described above. Therefore, by establishing an in-home network in accordance with the systems and methods for telephonic communication, multiple devices and/or remote terminals can be interfaced to different network lines, regardless if the particular device/base is directly connected to the network line. Moreover, this capability is provided in a power efficient manner.

Other aspects, advantages and novel features of the invention will become apparent from the following Detailed Description of Preferred Embodiments, when considered in conjunction with the accompanying drawings.

BRIEF DESCRIPTION OF THE DRAWINGS

The drawings illustrate both the design and utility of preferred embodiments of the invention, wherein.

DETAILED DESCRIPTION OF PREFERRED EMBODIMENTS

Figure 1:
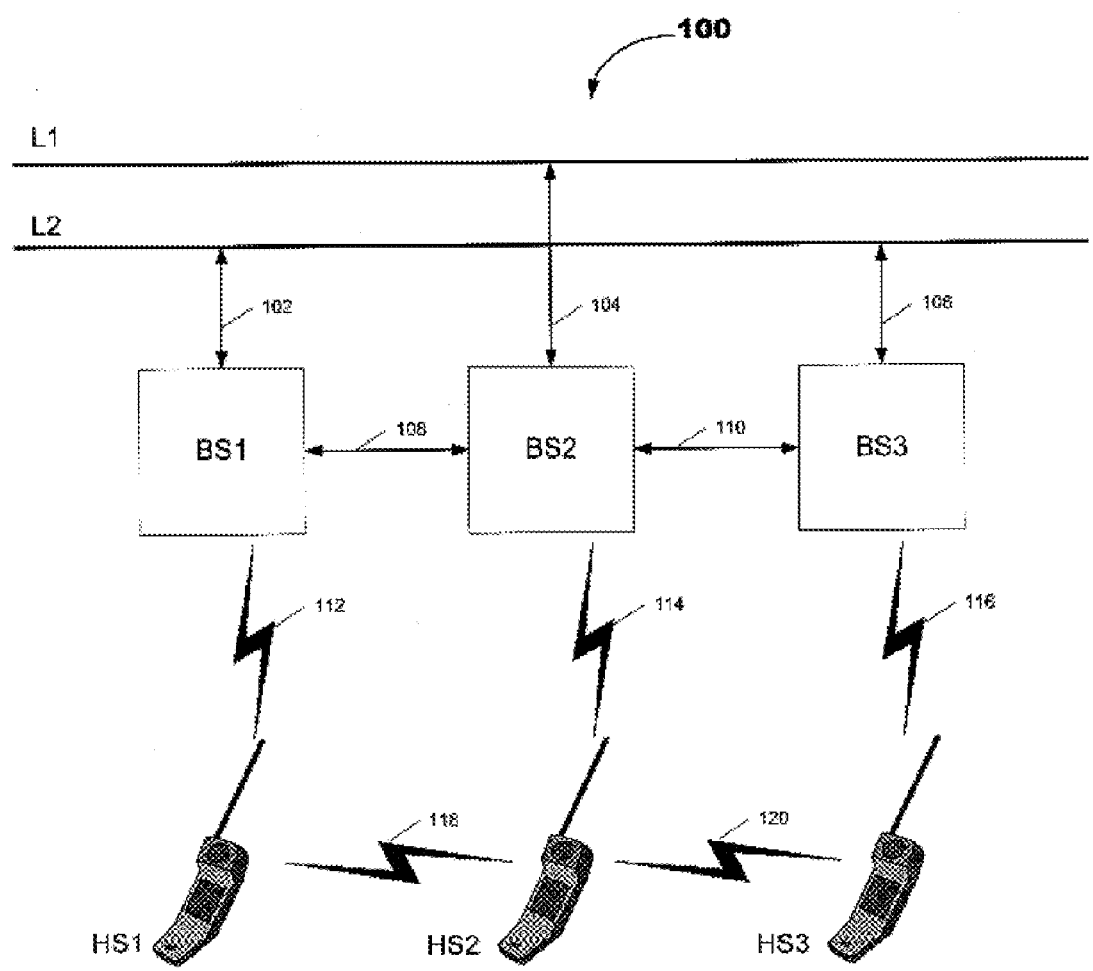
FIG. 1 is a diagram of one embodiment of an in-home network in accordance with the invention.

One embodiment of an in-home network 100, in accordance with the claimed invention, is illustrated in FIG. 1. Network 100 is presented as one example of a network architecture that embodies the present invention and should not be interpreted as limiting the scope of this invention. Further, while the discussion below refers to an in-home networks, this is intended to include office or work place environments, or any environment in which multiple network phone lines are interfaced to multiple communication devices. Network 100 comprises three bases BS1, BS2, and BS3. More or less bases may be used as required. BS2 is interfaced to first network line L1 by connection 104, while BS1 and BS3 are interfaced to a second network line L2 by connections 102 and 106 respectively. L1 and L2 may belong to a network backbone such as an ISDN network or, alternatively, to a wireless communication system backbone such as a GSM or CDMA network. Additionally, lines L1 and L2 can be cable network lines carrying a variety of multi-media signals including voice communications.

Each base BS1, BS2, and BS3 has an associated handset HS1, HS2, and HS3 to form base-handset pairs. While a handset is the typical embodiment, each base BS1, BS2, and BS3 can be interfaced to any remote terminal that includes the appropriate communication hardware and software. The base-handset pairs communicate over bi-directional RF communication links 112, 114, and 116. In one embodiment, the RF links use the 900 MHz-ISM band, which is common in North America. Alternatively, the RF links may conform to the European DECT specification or the Japanese PHS standard. In still another implementation, the RF links conform to a proprietary specification that optimizes system performance, including performance of features discussed below. Therefore, each handset HS1, HS2, and HS3 communicates with one and only one base BS1, BS2, and BS3, respectively. It should be noted that a base, such as BS1, BS2, or BS#, is not required to have a cordless handset. A base in an in-home network, such as network 100, can be an intercom device, or have a handset that is attached to the base via a telephone cord.

In addition to RF links 112, 114, and 116, which provide base-to-handset communication, bi-directional links 108 and 110 provide base-to-base communication. The base-to-base communication links can be RF links and can operate in the 900 MHz range to enable operation in the bandwidth constraints of the 900 MHz-ISM band. Alternatively, a higher bandwidth solution can be provided that would allow bases BS1, BS2 and BS3 to handle at least two concurrent connections. In one embodiment, base-to-base links 108 and 110 are RF links. For example, in one embodiment, the RF links 108 and 110 conform to the hardware and software requirements described in the Bluetooth™ specification. The Bluetooth™ specification is an open specification for a short-range, cable-replacement, radio technology, the development of which has been managed by a group comprising leading telecommunications and computer technology companies. The Bluetooth™ standard is explained in volume 1 of "The specification of the Bluetooth System," which is incorporated herein by reference in its entirety. The Bluetooth™ specification defines radios that operate in the 2.4 GHz range using frequency-hopping techniques to keep communication flowing even in spaces that are "noisy." The standard defines both synchronous and asynchronous communication, with the synchronous bands geared to carry relatively high-quality voice and the asynchronous communication supporting data at slightly more than 700 Kbps. Distance is limited to about 10 meters. In another embodiment, base-to-base links 108 and 110 comprise power line home network connections. In this implementation, the power delivery lines for each base are used to transmit and receive data communication between the bases. In a third embodiment, phone line home network connections comprise the base-to-base links. The use of phone lines for communication between telecommunication devices is well known in the art.

Figure 2:
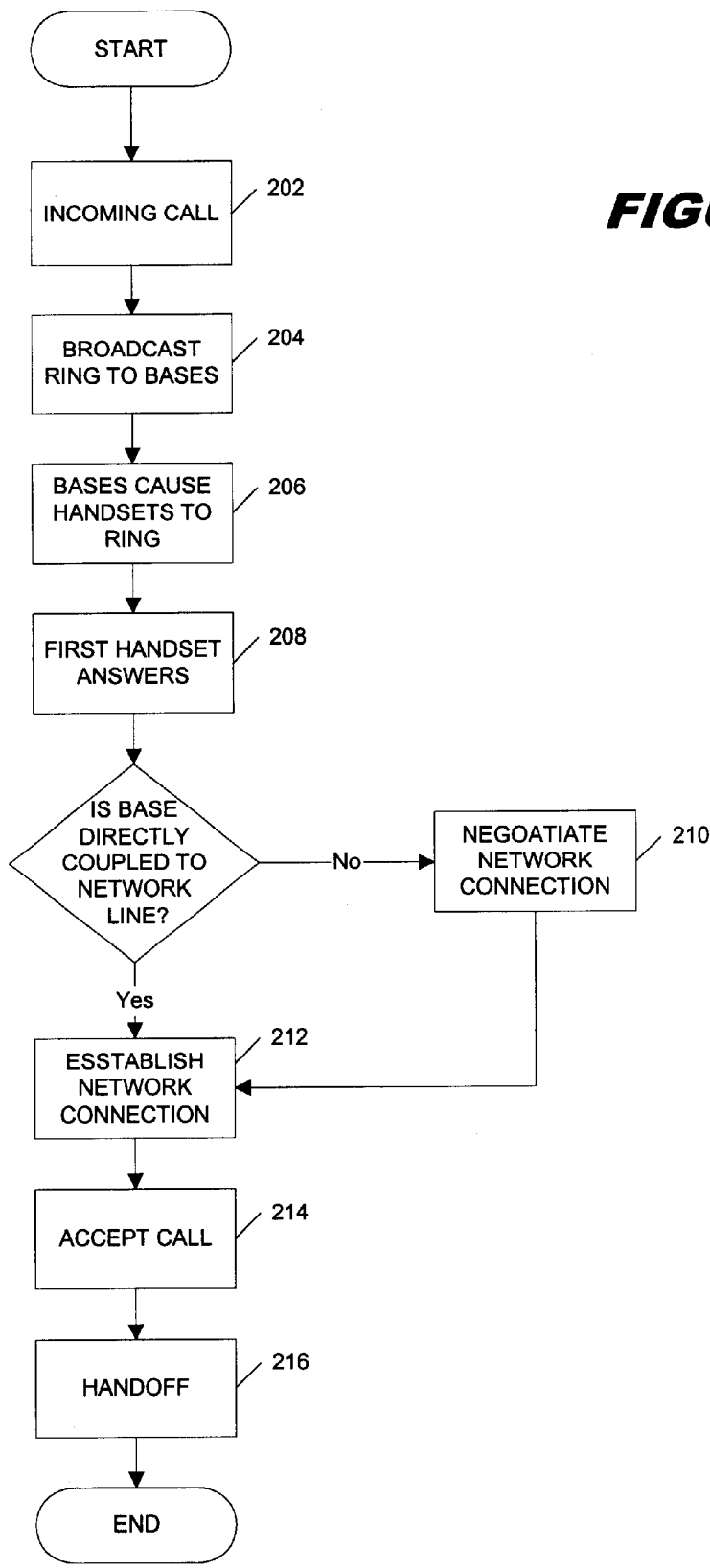
FIG. 2 is a diagram of an exemplary process flow for answering a call associated with one base in the in-home network illustrated in FIG. 1 using a handset associated with a second base in in-home network illustrated in FIG. 1.

Base-to-base communication allows a handset, such as HS1, to communicate with a line attached to a different base, such as L1 attached to BS2. In FIG. 2, a method of answering an incoming communication associated with a first base using a handset associated with a second base is illustrated. With reference to both FIGS. 1 and 2, the first step 202 in the process is an incoming communication on L1, for example, being received by BS2. In step 204, BS2 broadcasts the presence of the incoming communication to BS1 and BS3 over base-to-base links 108 and 110. The broadcast signaling includes the line (L1 or L2) with the incoming communication and which base (in this case BS2) is receiving the communication. In step 206, each base BS1, BS2, and BS3 will cause its corresponding handset HS1, HS2, and HS3 to indicate an incoming communication. The incoming communication indicator is typically a ring generated by a ringer or buzzer (not shown) contained in each handset HS1, HS2, and HS3. In an alternative embodiment, each base BS1, BS2, and BS3 generates the incoming communication indicator. In response to the incoming communication indicator, a user will answer using the nearest or most convenient handset. (Step 208).

For example, the user can answer the communication by picking up HS1. To answer, the user typically presses a key on HS1 to signal an "off-hook" status to BS1. BS1 then begins the process of establishing a network connection between L1 and HS1. If the incoming communication is on a network line directly connected to BS1 (in this case L2), then BS1 makes the network connection (step 212) and HS1 accepts the incoming communication (step 214). If, on the other hand, BS1 is not directly connected to the network line associated with the incoming communication, then BS1 must negotiate (step 210) with the base (in this case BS2) that is directly connected to the appropriate network line (in this case L1). In doing so, BS1 negotiates with BS2 to establish communication information such as what channel is being used for the communication, the location of HS1, and any timing parameters that may be required within network 100. Upon completing the negotiation with BS2, BS1 connects BS2 to HS1 using link 108 as a bridge. Hence, BS2 and HS1 are interfaced via RF link 112 and communication link 108. The bridging of HS1 and BS2 occurs seamlessly with respect to the user.

In optional step 216, BS1 hands-off HS1 to BS2. The handoff occurs if it is more efficient in terms of network 100 performance. For example, HS1 can be located at the outer edge of coverage for BS1, resulting in intermittent or poor communication between BS1 and HS1. If HS1 is closer to BS2, then better, more efficient communication can be achieved between BS2 and HS1. In deciding whether to handoff HS1, spatial distance is not a factor. Rather, if the signal is stronger at BS2, then it is the most desirable base for HS1 to use. Therefore, a measure of signal strength will determine if a handoff should occur. One handoff approach would be to handoff if the signal is stronger than a certain minimum strength at the base with the desired line. This approach uses the minimum amount of bandwidth. An alternate method would be to reduce HS1 transmit power until only one base was above the minimum threshold. That base would then be selected as the handset link. This is the minimum handset power approach. Therefore, BS1 can initiate a handoff of HS1 to BS2 to take advantage of the fact that HS1 has a better connection to BS2.

It should be noted that HS1 maintains a communication link with only one base both before and after the handoff. Cordless telephone standards such as DECT and PHS provide multi-channel link networks that allow a single base to handle multiple handsets and allows handsets to communicate with multiple bases; however, this requires handsets to use more power to track and acquire multiple base stations. If conserving power to increase standby time and reduce battery cost is important, then the base-to-base communication allows for a simulated multi-handset, multi-line capability that uses less power, because each handset communicates with one and only one base. Moreover, the handoff procedure described allows the network to operate at peak efficiency.

Figure 3:
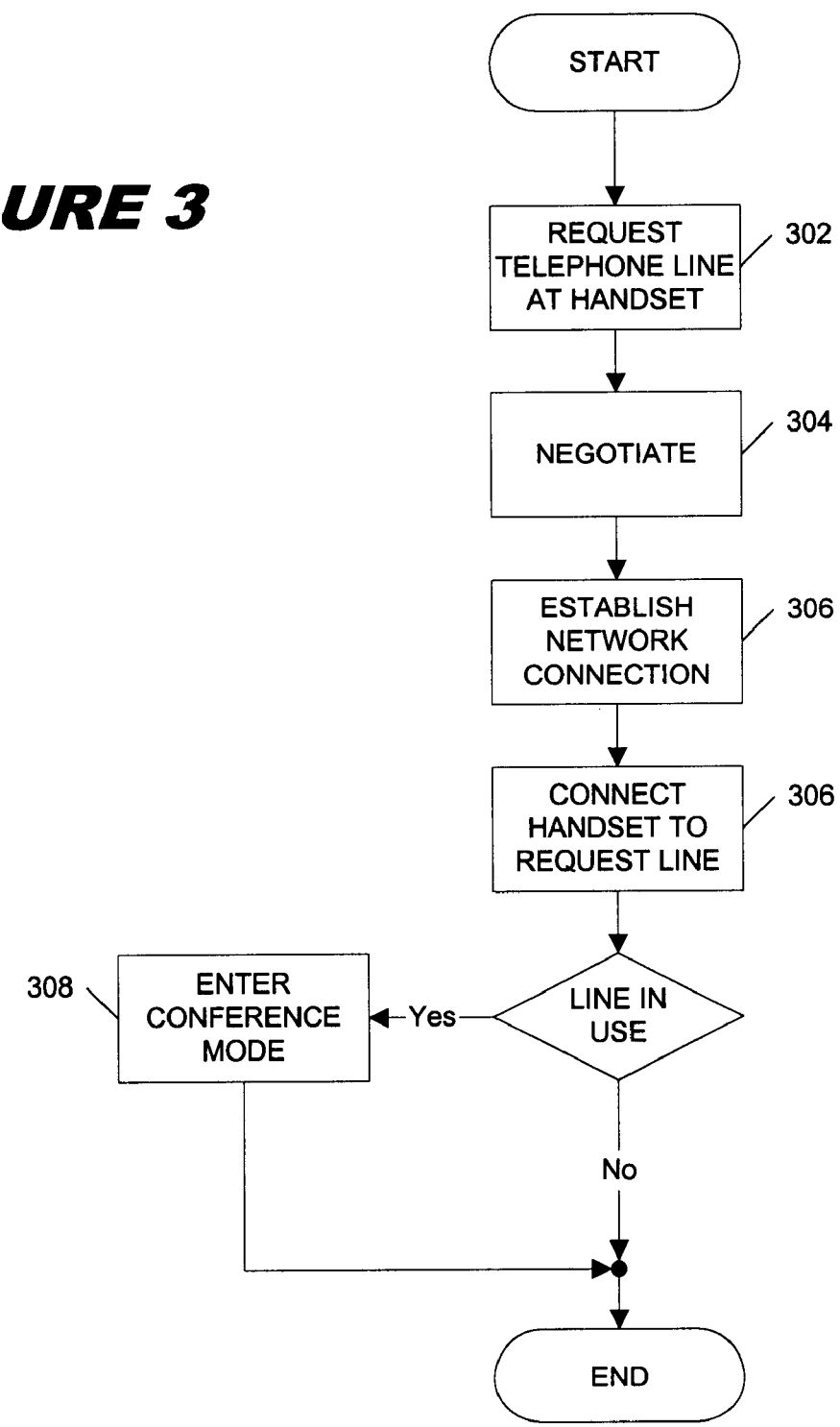
FIG. 3 is a diagram of an exemplary process flow for accessing a network line using a handset in the in-home network illustrated in FIG. 1.

FIG. 3 illustrates a process for using a handset to access a network line attached to a base associated with a different handset. For example, if a user picked up HS1 and wished to place a voice communication on L1, then BS1 will need to negotiate with BS2 in order to connect HS1 to L1. This situation could occur for a variety of reasons. For example, L1 can be a local telephone line and L2 a long distance line. If a user selected HS1, but wished to place a long distance call, then he would need to be connected to L2. Therefore, in step 302, the user would need to request L2 after selecting HS1. The user can, depending on the embodiment, request a particular line in several ways. The request can even be inherent based on the dialed number. For example, if the user dials a "1" for long distance, then BS1 automatically begins negotiating with whichever base (in this case BS2) is connected to the long distance line (in this case L1). Alternatively, requesting a line can require some user input through HS1. In a typical multiple line system, each handset will include switches or buttons (not shown) that can be used to select a desired line.

In step 304, after the line is requested, BS1 uses base-to-base communication to negotiate with BS2 so as to connect HS1 to L1. Again, information such as what channel is being used, the location of HS1, and any required timing parameters are included in the negotiation between BS1 and BS2. In step 306, a network connection with L1 is established and, in step 308, HS1 is connected to L1. Another handset, however, may already be engaged in a communication on L1, i.e., the line is in use when HS1 is connected. If this occurs, then, in step 308, HS1 enters conference mode with the other handset and the party on L1.

Figure 4:
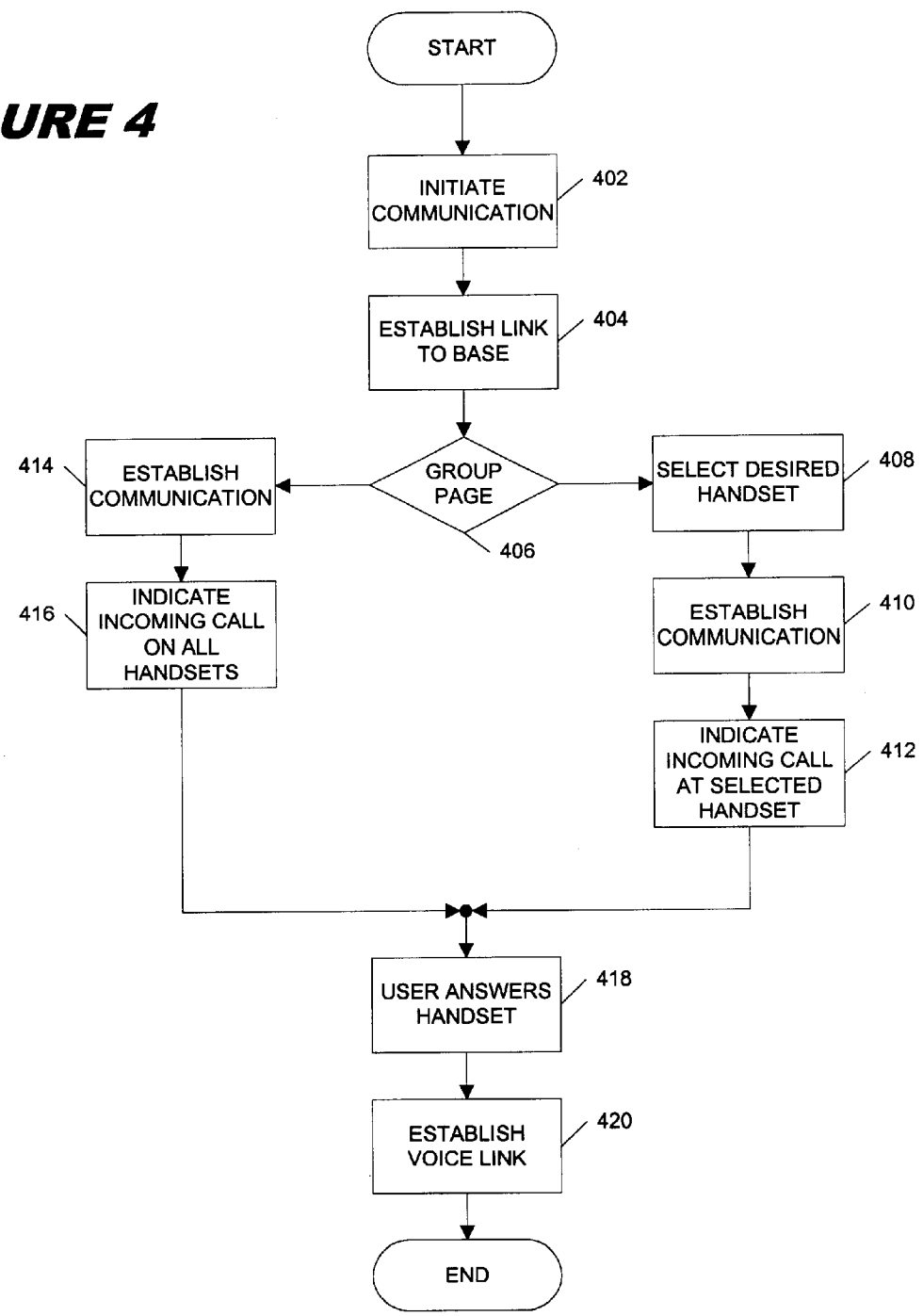
FIG. 4 is a diagram of an exemplary process flow for handset-to-handset communication within the in-home network illustrated in FIG. 1.

Base-to-base communication can also facilitate handset-to-handset direct communication. A method of handset-to-handset communication within network 100 is illustrated in FIG. 4. In step 402, a user of HS1, for example, initiates handset-to-handset communication with a second user of, for example, HS2. In one implementation, each handset in network 100 has a unique key or button for establishing handset-to-handset communication. The user presses this key or button when the user wants to communicate with another handset within the network. In another implementation, each handset in the network has a unique number that can be dialed from any other handset in the network. In step 404, HS1 establishes a link to its associated base BS1 and communicates the desire to communicate with another handset. If only a general desire to communicate with another handset is expressed in the signaling between HS1 and BS1, then, in step 406, BS1 broadcasts a group page over base-to-base communication links 108 and 110. In this case, bases BS2 and BS3 establish communication with BS1 (step 414) over links 108 and 100 and indicate an incoming call on HS2 and HS3 (step 416). A user then answers whichever handset the user is nearest (step 418), and the group paging stops. In step 420, a voice link is established between HS1 and whichever handset the user answered.

Alternatively, in embodiments that use a unique method to identify a particular handset (step 408), such as a unique number, BS1 will communicate the desired handset to the other bases. Assuming HS2 is the handset to be communicated with, then, in step 410, BS2 will establish communication with BS1 and negotiate the channel to be used, handset location, and timing. BS2 indicates an incoming call on HS2, in step 412. The user answer HS2 (step 418) and then HS1 is instructed by BS1 to communicate directly with HS2 (step 420). In one implementation, the connection between HS1 and HS2 is first established through RF interface 112, communication link 108, and RF interface 114. HS1 may then be commanded to communicate directly with HS2 over a RF link 118. In an alternative embodiment, link 118 between HS1 and HS2 is established directly as opposed to using communication link 108 to bridge the two handsets. Link 120 between HS2 and HS3, and the link between HS1 and HS3 can be established in a similar manner.

Figure 5:
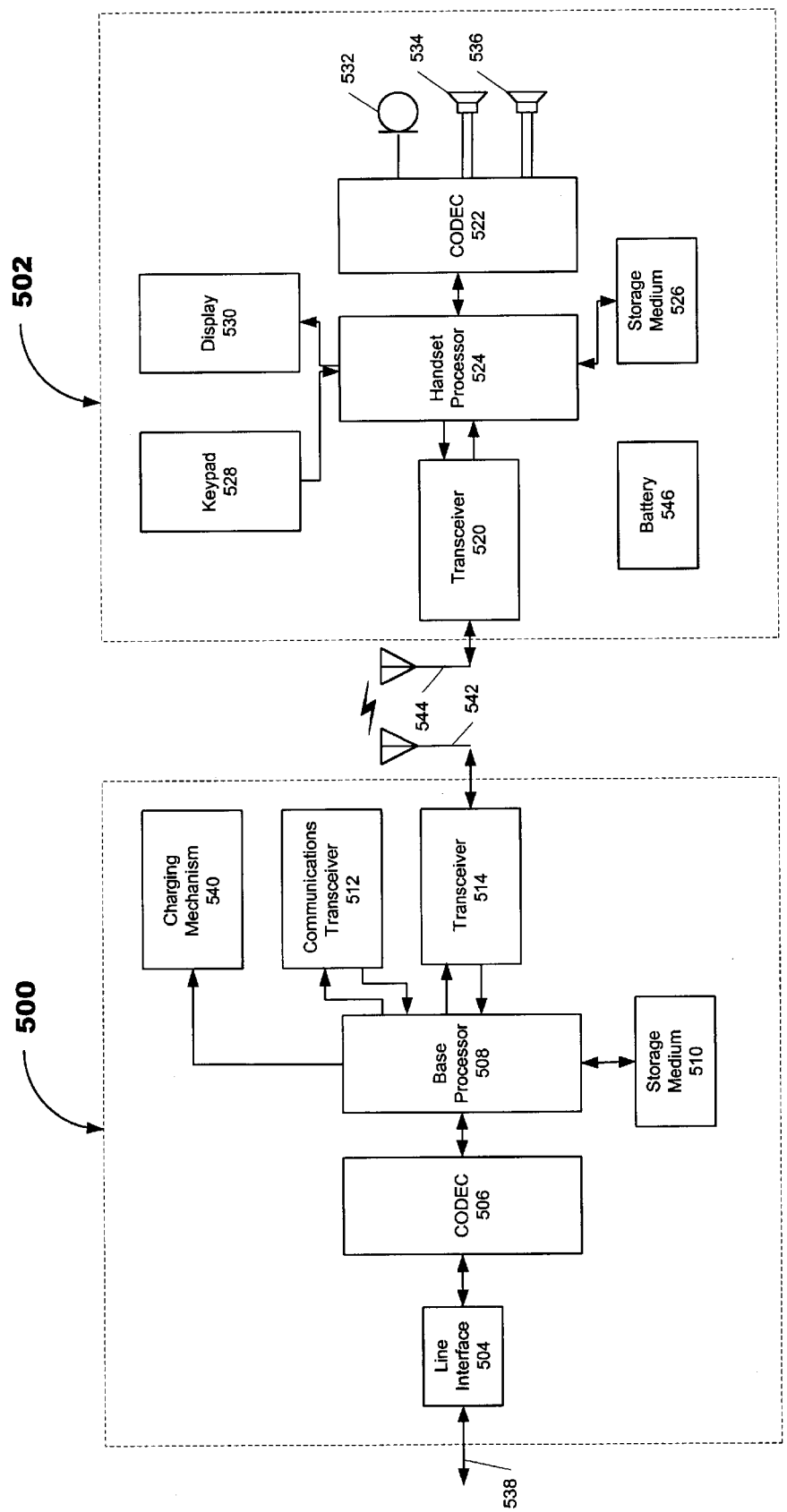
FIG. 5 is a diagram of the logical components of a sample base and handset in accordance with the invention.

An exemplary base 500 and handset 502 are illustrated in FIG. 5. Handset 502 comprises an antenna 544 for transmitting and receiving RF communications signals over a RF communication link with base 500. When a call is originally received, base 500 will typically signal handset 502 over the RF communication link. When the signal is received by handset 500, handset processor 524 causes ringer 534 to ring in order to alert the user that a communication is pending. The user can answer the communication by pressing an appropriate key on keypad 528. In some implementations, keypad 528 comprises alpha numeric keys as well as special function keys such as an answer key, end key, and may include keys for navigating through information displayed to the user on display 530. An incoming communication to base 500 is received through line interface 504. The incoming communication is interfaced to processor 508 which converts the call information to a digital receive signal. The digital receive signal is sent to transceiver 514, which modulates the digital receive signal with an RF carrier and transmits the resulting modulated RF signal via antenna 542. The RF signal will be received by transceiver 520, which converts received RF signals to baseband signals. Essentially, this comprises mixing the RF signal with a local oscillator signal in a manner that removes the RF carrier and results in a baseband information signal. In this sample implementation, the baseband information signal is converted to a digital information signal by processor 524. CODEC (Coder-Decoder) 522 converts this digital information signal to a drive signal that is capable of driving speaker 536. Speaker 536 converts the drive signal into an audio signal that is heard by the user.

Conversely, the user can initiate a communication by dialing an appropriate number on keypad 528. This will cause processor 524 to establish a link with base 500. The user will then speak into microphone 532, which will convert the speaker's voice into an electrical voice signal. CODEC 522 converts the electrical voice signal from microphone 532 into a digital transmit signal and processor 524 will convert the digital transmit signal into a baseband transmit signal. In a preferred embodiment, CODEC 522 and processor 524 are combined in one integrated circuit. In this case, the circuit is generically referred to as the handset processor. The baseband transmit signal is converted into an RF transmit signal by transceiver 520. This process consists of the baseband signal being mixed with an RF carrier. The process of mixing the baseband transmit signal up to RF and, similarly, mixing down the received RF signal to a baseband signal when a call is received, may involve two step processes. In this case, the system is referred to as an intermediate frequency system because the signal is converted to an intermediate frequency (first step) before being converted to the final frequency (second step). An alternative implementation converts the signals directly to the desired frequency. This later type of transceiver is referred to as a direct conversion transceiver.

Storage medium 526 is used to store control and communications software, used by processor 524 to control the operation of handset 502. The control software is used by processor 524 to control the operation of transceiver 520, i.e., channel access, etc. The communication software allows handset 502 to communicate with base 500 when a communication link is established between the two. Additionally, storage medium 526 is used to store permanent data such as user settings and operational parameters as well as temporary data.

Base 500 comprises antenna 542 used to transmit and receive RF signals and transceiver 514. Transceiver 514 mixes RF signals received via antenna 542 from handset 502 down to baseband receive signals. Base processor 508 converts baseband receive signals to digital receive signals and base CODEC 506 converts these signals to the appropriate format and sends them to line interface 504. In one embodiment, CODEC 506 and processor 508 are combined in one integrated circuit. Again, the one circuit is referred to generically as the base processor. Line interface 504 interfaces the base to a network line. The network line can belong to a wired network such as the PSTN, ISDN, or a cable network, or a wireless communication system, such as a GSM or CDMA system. In the case of a wireless communication system, line interface 504 may be another transceiver for transmitting and receiving RF signals between the base and the wireless communication system. Storage medium 510 is used to store control and communications software for base 500 as well as temporary and permanent data. Base 500 also includes charging circuitry 540, which charges battery 546 in handset 502. In one implementation, base 500 includes a cradle to hold handset 502 and charging circuit 540 is coupled to contacts (not shown) in the cradle. These contacts interface to contacts (not shown) on handset 502. Charging circuit 540 charges battery 546 through the contacts when handset 502 is in the cradle of base 500.

Additionally, base 500 includes base-to-base communication transceiver 512. In one implementation, communications transceiver 512 is a Bluetooth™ transceiver. The Bluetooth™ specification defines a radio interface that operates in the 2.4 GHz-ISM (Industrial Scientific-Medical) band. The advantage of using the ISM band is that it operates worldwide and is license-free and open to any radio system. In the U.S., the ISM band ranges form 2.4000 GHz to 2.4835 GHz and in Japan it ranges from 2.471 GHz to 2.497 GHz. Using Bluetooth™ transceivers allows portable devices to communicate wirelessly via short-range networks. Each device can simultaneously communicate with up to seven other units by forming piconets, and can simultaneously belong to several piconets. Alternatively, communication transceiver 512 can be implemented using a customized RF interface. For example, in one implementation, communication transceiver 512 uses the 900 MHz spectrum that allows a low bandwidth solution compatible with the 900 MHz-ISM band commonly employed for RF connections 112, 114, and 116. Of course other frequencies can be utilized in custom solutions for communication transceiver 512.

In another embodiment, phone line home network connections are used for communication transceiver 512. This entails using regular telephone lines to make the connection from base to base. This is a common method of connecting telecommunications devices such as telephones, answering machines, and modems. Another alternative is to use power line home network connections. Power line connections impose communication signals on the power delivery lines in each device in the in-home network. Therefore, extra cables and connectors are not required to implement power line home network connections.

Figure 6:
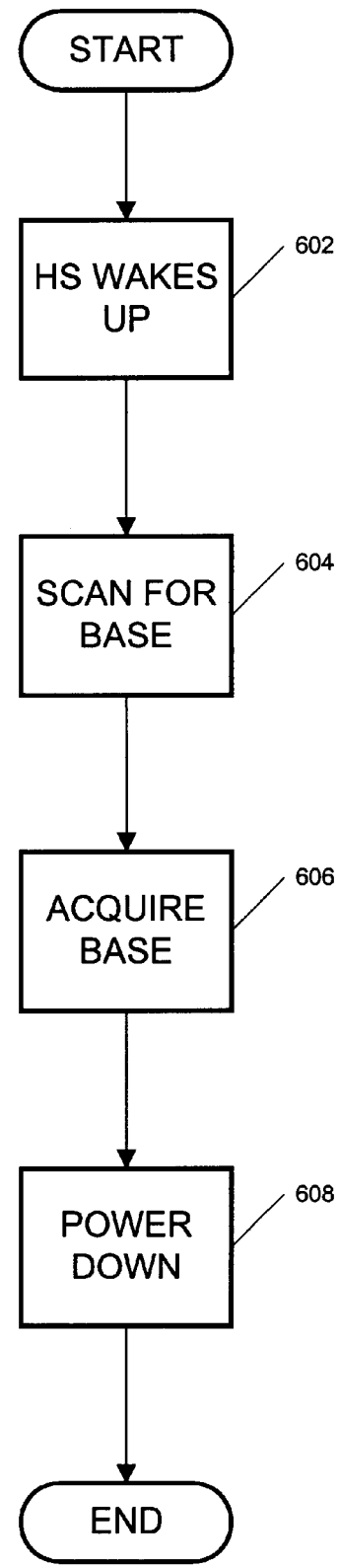
FIG. 6 is a diagram of an exemplary process flow for a handset acquiring a base in the in-home network illustrated in FIG. 1.

Because the handset often will not be in the cradle where the battery can recharge, battery life is an important concern. In order to conserve battery life and to enable longer standby and talk times, the handsets go into sleep mode when not in use. In order to ensure that a call is not missed, the handset wakes up at set intervals and re-acquires the base (FIG. 6, step 602). In one implementation the handset wakes up every one second to reacquire the base. In order to acquire the base, the handset transceiver 520 will scan the RF frequency spectrum looking to acquire a signal from base transceiver 512 (step 604). An advantage of the claimed invention is that the features and benefits described are enabled, even though each handset is interfaced to only one base at any given time. Being interfaced to only one base allows the handset to quickly acquire the base and power back down in steps 606 and 608, respectively. Thus, valuable battery capacity is saved by scanning for only one base, as opposed to scanning for multiple bases or multiple RF channels. Another key feature that saves battery power during acquisition and during active conversation, is the ability to handoff a handset if it is closer to an alternative base. This allows for more efficient RF communication between base and handset, which reduces the power required for the base-handset communication.

Another advantage of the claimed invention is the ability to build the in-home network one piece at a time, while maintaining backward compatibility with older devices. For example, if a user already had BS1 and BS2 and associated handsets HS1 and HS2, but wanted to add a function, such as voice recognition for voice dialing, then the user can purchase a new base BS3 with the required function. New base BS3, and its associated handset HS3, can then be integrated into the network, and the voice recognition function could then be shared between lines L1 and L2 through communication links 108 and 110. Voice recognition is just one example of a function that can be added to an in-home network and shared between the components comprising the network. It should also be noted that any one of bases BS1, BS2, and BS3 can have two line interfaces. The system is not dependent on each base being a one-line base. Therefore, two-line phones can also be integrated into network 100. Other example functions and/or components that can be added to and shared within an in-home network include modems, answering machines, and a caller ID database. A caller ID function is difficult to share between devices, however, a database against which to check incoming calls (caller ID database) is a resource that can be shared. The database is simply stored in one device, and accessed via base-to-base communication.

Figure 7:
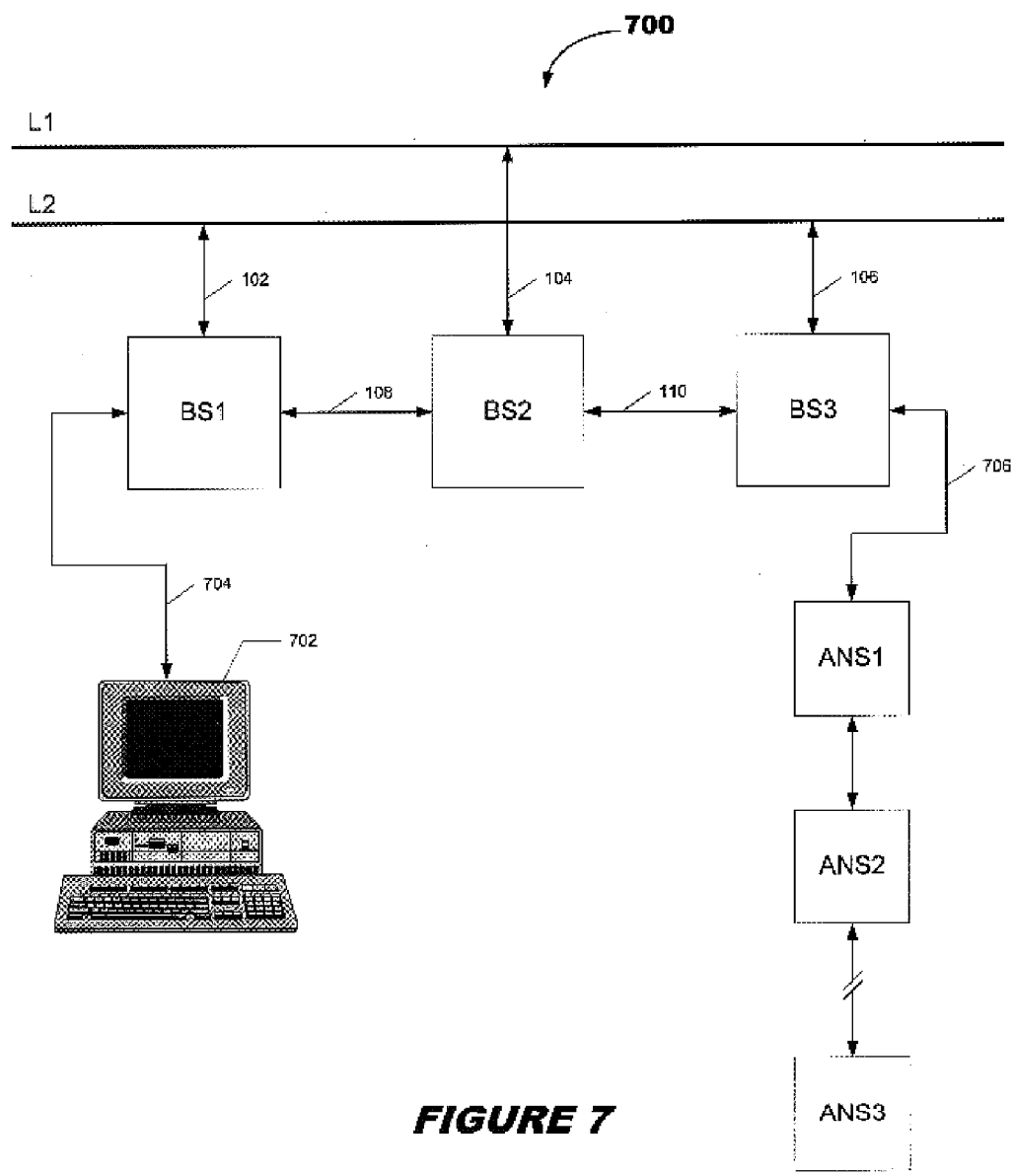
FIG. 7 is a diagram of a second embodiment of an in-home network in accordance with the invention.
Figure 8:
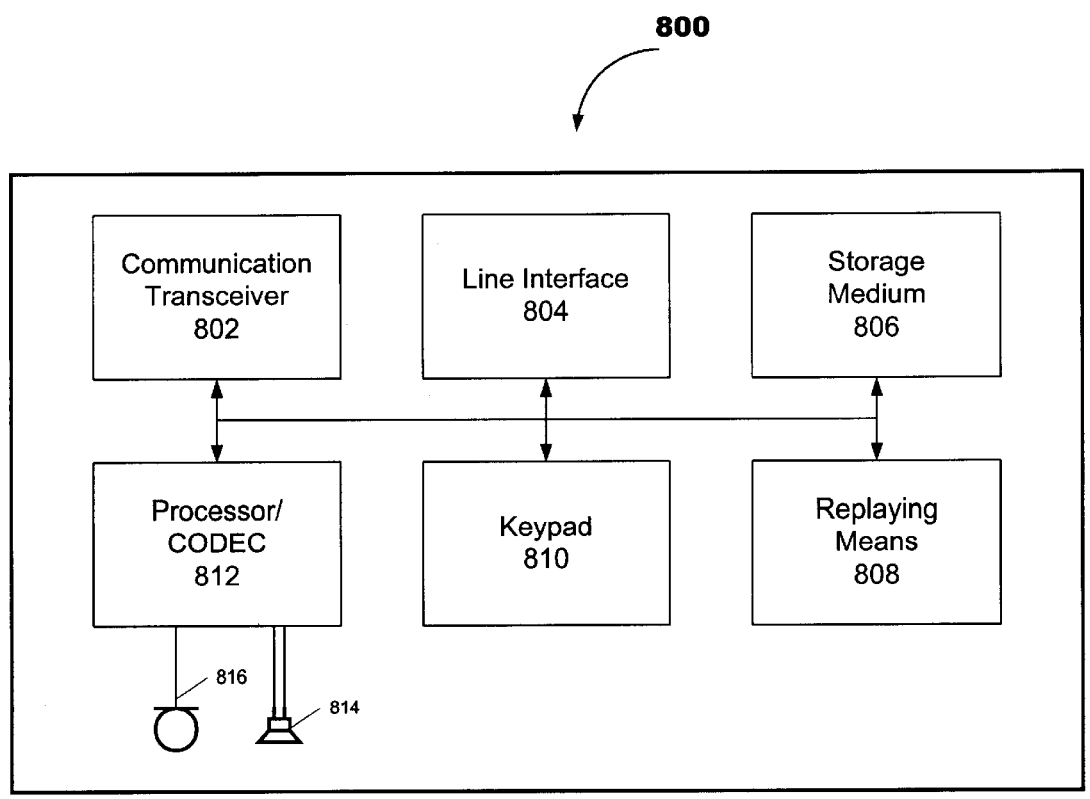
FIG. 8 is a diagram of the logical components of a sample answering machine in accordance with the invention.

FIG. 7 illustrates a network 700 comprising several answering machines ANS1, ANS2 and ANS3, which are shared by bases BS1, BS2, and BS3. Three answering machines are illustrated for sake of convenience, not limitation. Moreover, network 700 can include other communication devices configured for base-to-base communication. For the purpose of this specification, claims, and drawings, a communication device is defined as any device that can be used to send or receive communications over a network line. FIG. 8 illustrates an answering machine 800 in more detail. Answering machine 800 comprises a communication transceiver 802 that is compatible with base communication transceiver 512. In this way, answering machine 800 can be shared among BS1, BS2, and BS3. Each answering machine includes a storage medium 806 for storing a message associated with an unanswered incoming communication and a replaying mechanism 808 for replaying the message when required by the user. In one implementation, storage medium 806 is an audio tape (digital or analog), as is commonly used in answering machines today. In a second implementation, storage medium 806 is a digital storage medium that stores a digital copy of the message. For example, the digital storage medium can be Flash, SRAM, EEPROM, etc.

Some embodiments of answering machine 800 can include a line interface 804. In these embodiments, for example, at least one base in the in-home network is not connected to a network line. When an incoming communication comes into answering machine 800, answering machine 800 broadcasts the presence of the communication to bases in the network via communication transceiver 802. The bases cause their associated handsets to activate their incoming communication indicators to notify the user to the presence of an incoming communication. If the user answers, the particular base will negotiate with answering machine 800 to connect the user to line interface 804. If the user does not answer, answering machine 800 will answer and store a message in storage medium 806.

In an alternative implementation, one or all of the bases connected to network 700 include a digital storage medium (not shown) for storing messages related to unanswered calls. The answering machine(s) can access the storage medium through communication means 706 when required. The user may press a play key on keypad 810, for example, when the user wants to hear stored messages. The answering machine, for example ANS1, will establish a link 706 with one or all of bases BS1, BS2, and BS3 in order to access the storage medium therein. Any stored messages will be transmitted to ANS1 over link 706. In one implementation, ANS1 includes a processor/CODEC 812 that converts data received from communication means 802 into a drive signal that drives speaker 814. Additionally, microphone 816 can be used to record messages either in storage medium 806, or in storage means residing in the bases. The basic functioning of an answering machine is well known. The advantage of the invention is that an answering machine resource can be shared and/or distributed throughout an in-home network.

It is advantageous to remove functionality, such as storage medium 806 and line interface 804, from the answering machines, because this allows them to be small and inexpensive. As a result, answering machines ANS1, ANS2, and ANS3 can be placed at convenient places throughout the home or office. For example, in a home environment, ANS1 can be installed on the wall next to an entrance from the garage so messages can be checked immediately upon arriving home. Alternatively, ANS1 could be placed just inside the door on a counter or wall. ANS2 can then be placed next to a bed, for example, and ANS3 on a work desk. As a result, the flexibility and convenience of network 700 is extended.

In addition to answering machines ANS1, ANS2 and ANS3, one or more personal computers 702 or other computing devices can be interfaced to network 700 as well. Personal computer 702 includes a communication transceiver (not shown) that is compatible with communication transceivers 512 and 802. If personal computer 702 is equipped with a microphone, speaker, and the proper communications components and software personal computer 702, then personal computer 702 can be used to send and receive communications on L1 or L2. In this regard, it is important to note that incoming and outgoing communications are not limited to voice communications. For example, it is common for personal computers to send and receive data communications over network lines. Moreover, as technology advances, voice and data communications are increasingly becoming merged. Therefore, in one embodiment, personal computer 702, or any communication device installed in in-home network 700, can also include a modem (not shown) that can be directly connected to a network line. The modem can, with the appropriate software, be used to send and receive data and/or voice communications over the network line. In one embodiment, personal computer 702 also includes a digital storage medium (not shown) for storing messages associated with unanswered communications. These messages are then accessed and replayed by answering machines ANS1, ANS2, and ANS3 using communication link 704. Additionally, in one implementation personal computer 702 contains the required telecommunications components to allow personal computer 702 to function as an answering machine, i.e., store and replay messages.

Network lines L1 and L2 are not limited to telephone lines. L1 or L2 can also be, for example, a cable network line or a wireless communication system interface. Many cable network lines offer telephone service over their cable networks. Therefore, a base-handset pair can still be attached to a cable network line as long as it includes the appropriate connection hardware. Additionally, however, a personal computer, a television, or a "set-top" box, for example, can also be connected to a cable network line. In this case, the personal computer, television, or set-top box would need to include a transceiver capable of communicating with other devices over base-to-base communication links.

Figure 9:
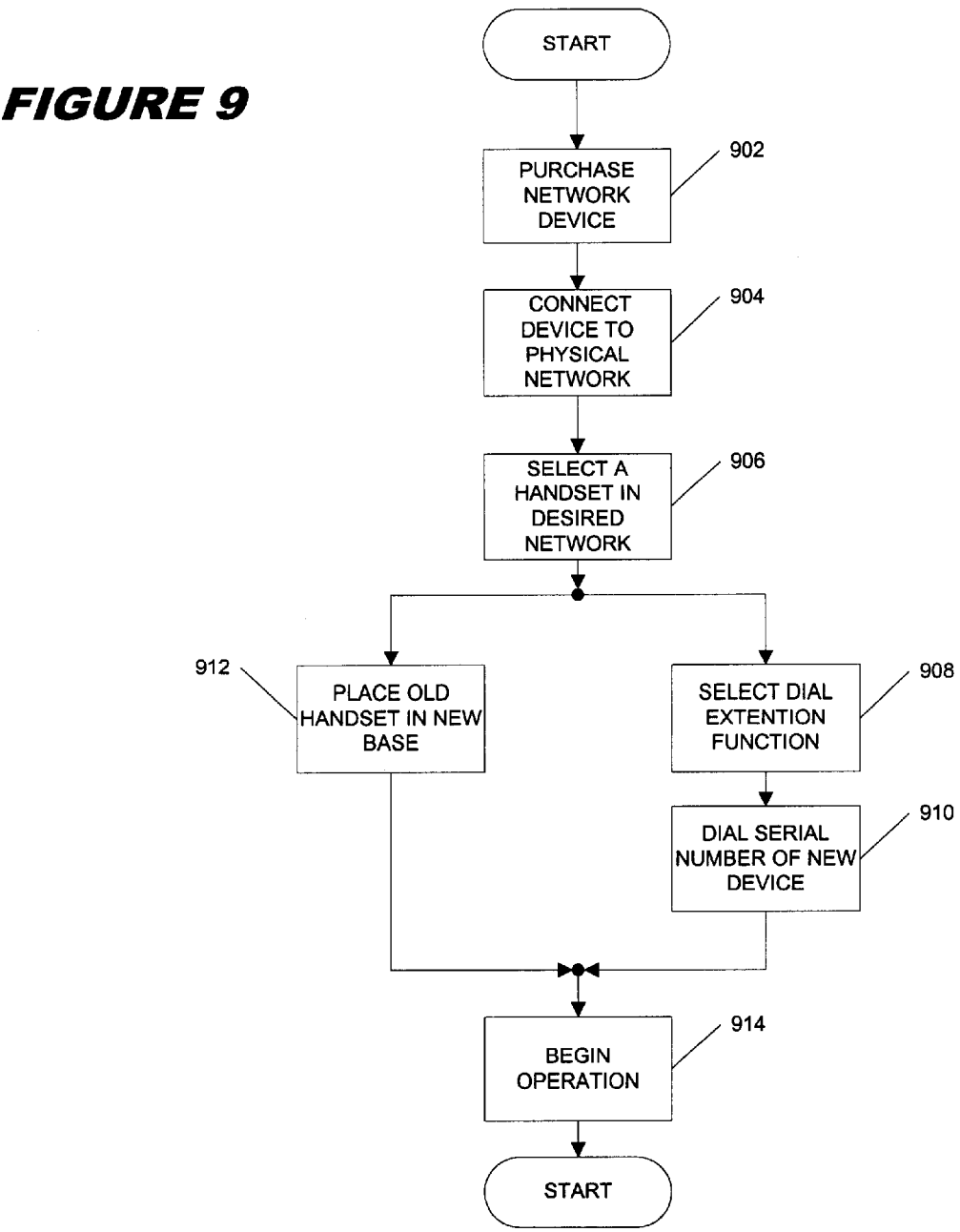
FIG. 9 is a diagram of an exemplary process flow for installing a base within a home network such as the network illustrated in FIG. 1 or FIG. 7.

New devices, e.g., bases, must be installed in network 100 and initialized. FIG. 9 depicts a method for initializing a new base, or other device, within an in-home network. First, in step 902 a new base-handset pair is purchased or otherwise obtained and installed in a home containing other bases, answering machines, personal computers, etc., equipped with communication transceivers capable of communicating with transceiver 512 or the like. In step 904, the base, or other device, is connected to the in-home network. If network lines L1 and L2 are part of a wireless communication system, such as a GSM or CDMA network for example, then new base-handset pairs need only be plugged in and powered on. The device will then acquire the wireless communication network automatically. If L1 and L2 are fixed lines, for example telephone or cable network lines, then the new device must be connected to a power source as well as to the network lines. Connecting to a telephone network is typically accomplished via RJ-11 connections, and coaxial cables and connectors are typically used for cable network connections.

At this point, some affirmative action initiated by a device already in the existing in-home network is required to initialize the new device. For example, if the new device is a base-handset pair, then a handset from a base-handset pair already in the in-home network can be selected (step 906) and placed in the new base (step 912). Initialization information is then passed from the "old" handset to the new base. Once the initialization information is passed to the new base, the new base can begin operation with the new handset (step 914). In one embodiment, for example, the new base is initialized with a predetermined network code that identifies the existing in-home network. To accomplish the initialization, the new base and the old handset can include contacts that interface with each other when the handset is in BS1. The contacts and interface may be similar to, or even part of, the charging interface discussed in connection with charging mechanism 540 in FIG. 5.

If a handset cannot be used to initialize the new device, e.g., the new device is not a base, then a dial extension function (step 908) can be used. This function allows the user to dial into the existing in-home network and, once connected to the in-home network, enter a serial number or other identifier associated with the new device. For example, if the new device is an answering machine, then the user can dial into the existing in-home network using a telephone. Once connected to the in-home network, the user can input through the phone's keypad a serial number (step 910) that identifies the answering machine. In this case, subsequent base-to-base signaling between the answering machine and the in-home network would need to include the serial number or other identifier of the answering machine so that the rest of the in-home network will recognize it.

Initialization is very important where the transceivers used for base-to-base communication, e.g., communication transceivers 512 and 802, are RF transceivers, such as Bluetooth™ transceivers. This is because an RF transceiver is able to communicate with any compatible RF transceiver that is within communication range. The range of a Bluetooth™ transceiver is typically around 10 m; therefore, the range can easily extend beyond a room or home in which the in-home network is intended to be confined. If new devices are not initialized into a particular in-home network, then they could interfere with another in-home network nearby. Moreover, if the initialization process does not require some affirmative action by a device currently in the existing in-home network, then a new device could initialize itself into the wrong network or into more than one network.

Figure 10:
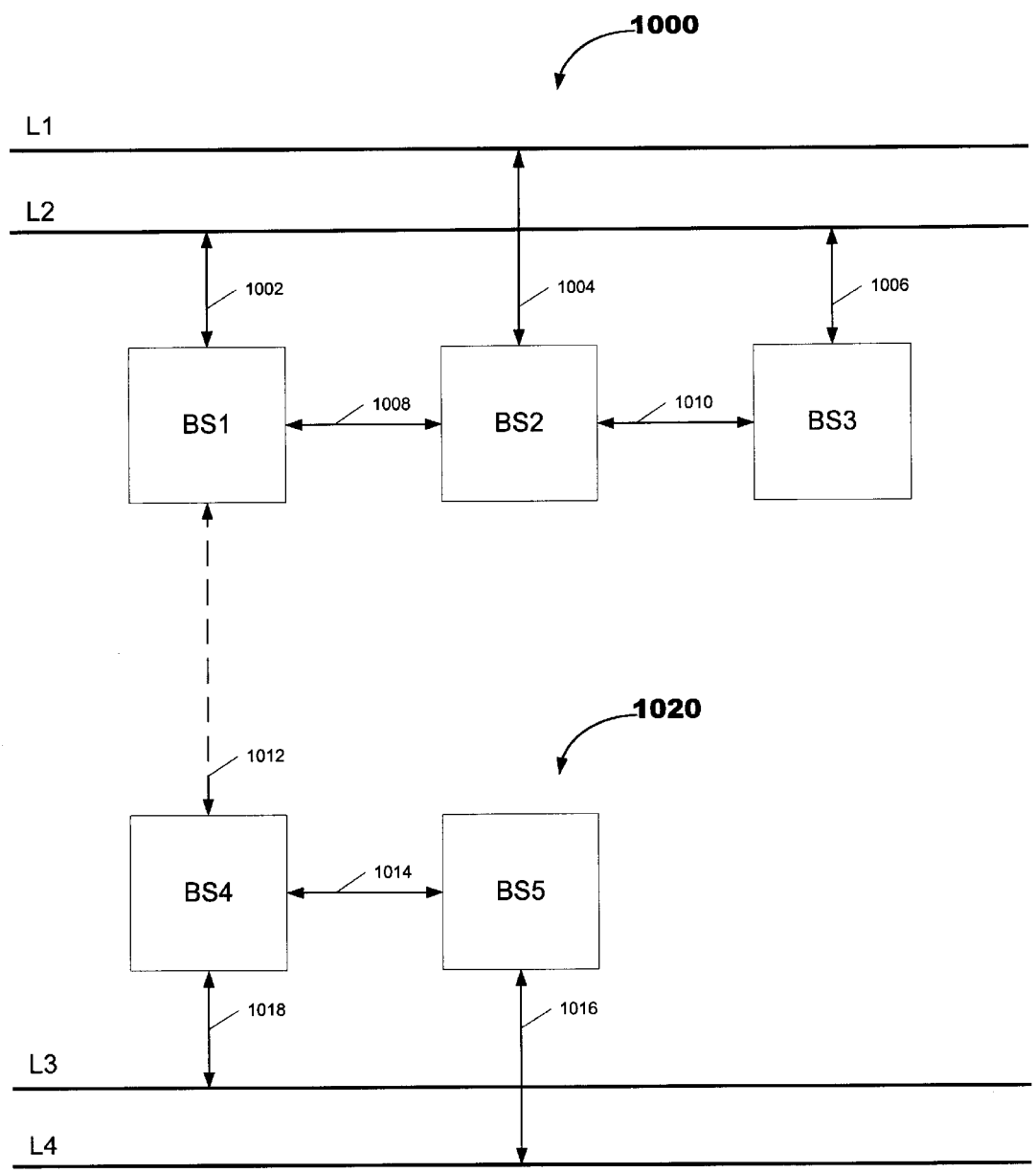
FIG. 10 is a diagram of a third embodiment of an in-home network in accordance with the invention.

The later situation is illustrated in FIG. 10, which illustrates two in-home networks 1000 and 1020 in close proximity. In-home network 1000 comprises two network lines L1 and L2, and three bases BS1, BS2, and BS3 coupled thereto via links 1002, 1004, and 1006. BS1, BS2, and BS3 perform base-to-base communication over links 1008 and 1010, which are RF links. In-home network 1020 is also within communication range of BS1. Therefore, BS1 is capable of establishing communication link 1012 with in-home network 1020, which comprises bases BS4 and BS5 coupled to network lines L3 and L4 through communication links 1016 and 1018. If link 1012 is established, then network 1000 could receive communications intended for network 1020 and vise versa. By initializing a new base, such as BS1, into the appropriate in-home network, such problems are avoided. Performing the initialization through the action of devices already in the intended in-home network ensures that BS1, for example, is not accidentally initialized into network 1020.

On the other hand, FIG. 10 can also be used to illustrate a situation where it is desirable for BS1, or network 1000, to establish base-to-base communication with network 1020, e.g., it is intended that L1, L2, L3, and L4 be part of the same in-home network. For example, L1 and L2 can be telephone lines and L3 and L4 can be cable network lines coming into the same home. Generally, devices configured to interface with L1 and L2 would not communicate or share functions with devices configured to interface with L3 and L4. Still, it may be desirable to bridge the two networks. For example, if either L3 or L4 carried local or long distance telephone traffic, then either BS4 or BS5 can be a base-handset pair. Therefore, it may be desirable to connect base-handset pairs in network 1000 with a base-handset pair in network 1020. This would allow resources such as answering machines or voice recognition dialing to be shared between base-handset pairs in both networks. In addition, a personal computer can be connected to either L3 or L4 in network 1020. If so, then it may be desirable to connect the personal computer with network 1000 as well, in order to share some of the functions previously discussed with relation to personal computer 702 in FIG. 7. In order to bridge the two networks, a device from one of the two networks must be initialized into the other network through one of the methods discussed. Once bridged, networks 1000 and 1020 become part of one in-home network.

Communication transceivers, such as transceiver 512, require software in order to operate correctly. For example, in the case of a Bluetooth™ transceiver, radio control software and communication software is required. A processor, such as processor 508 or 524, runs the radio control software to control the operation of the transceiver, i.e., the channel access operation of the transceiver. The communication software ensures that devices in an in-home network can communicate with each other. Each device can also include application software that depends on the type of device and the functions it is intended to perform. Any or all of this software may need to be updated at various times. There are several methods for updating software in a device, which is part of an in-home network, that take advantage of the functions and features of the invention.

Figure 11A:
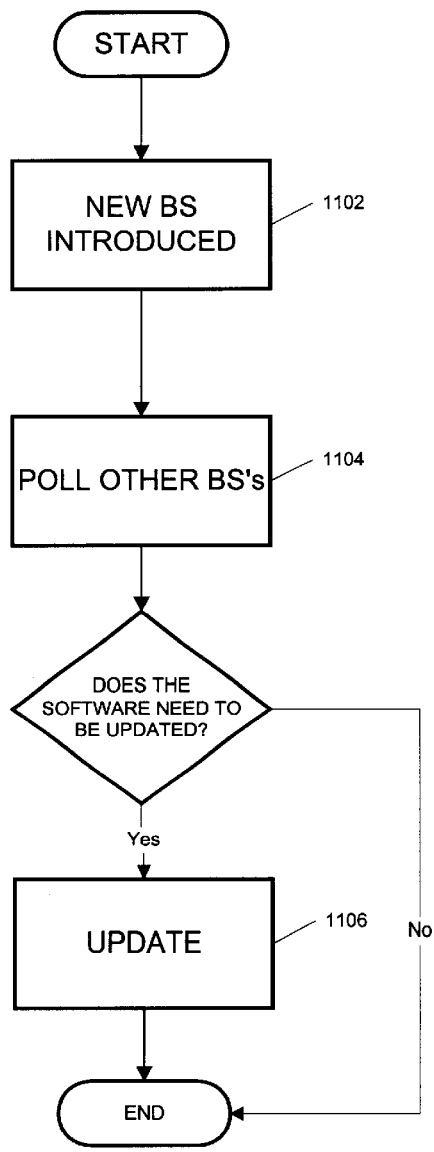
FIG. 11A is a diagram of an exemplary process flow for automatically updating base software in an in-home network.

One such method for automatically updating the software contained in each device within an in-home network is depicted in FIG. 11A. In step 1102, a new base, for example, is introduced to and initialized in an in-home network. In step 1104, the new base will poll other bases within the system using communication means 512 to determine what software version the other bases are using. If any of the other bases are using older software than the new base, the new base uploads (step 1106) the newer software to those bases.

Figure 11B:
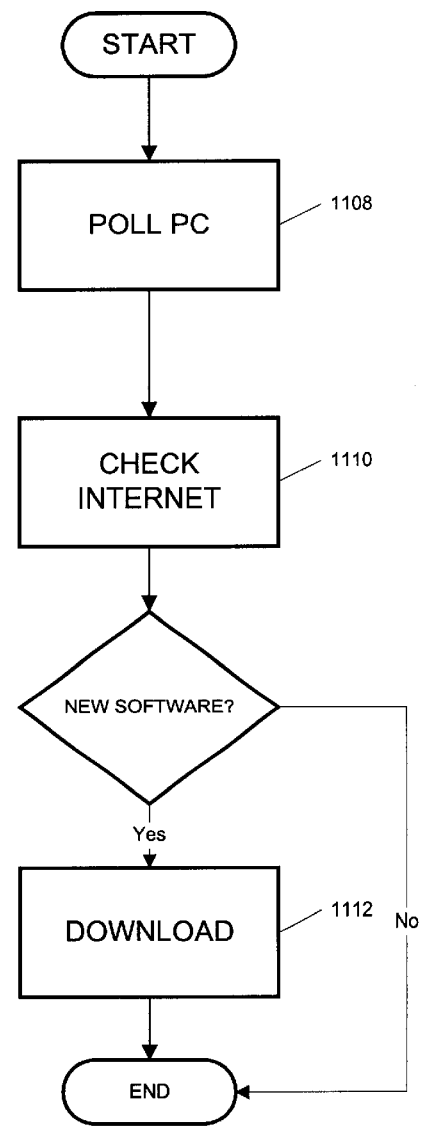
FIG. 11B is a diagram of another exemplary process flow for automatically updating base software in an in-home network.

FIG. 11B illustrates an alternative method of automatically updating base software. In step 1108 a base will poll a personal computer interfaced to the in-home network for new software. In step 1110, the computer will access the Internet and navigate to a predetermined web site, which contains new software versions. The personal computer will download the software if it is a more recent version than the version used by the base. In step 1112, the personal computer will then upload the software to the base. In one implementation, a particular base is designated to poll the computer on behalf of all the bases. In another implementation, each base within the in-home network may poll the computer individually. It should be noted that while the above example methods refer to bases, similar methods can be used to update software contained in any type of device included in an in-home network.

While various embodiments of the present invention have been shown and described above, it should be understood that they have been presented by way of example only and not limitation. Many other embodiments are possible, without departing from the spirit and scope of the invention. Thus, the breadth and scope of the present invention should not be limited by any of the above-described exemplary embodiments, but should be defined only in accordance with the claims and their equivalents.

What is claimed:

1. A communication system comprising a first base and a second base, the first base including:
   a first line interface configured to receive incoming communications over a first network line and to send outgoing communications over the first network line;
   a first communication transceiver configured to interface the first base over a base-to-base communication link to the second base;
   a storage medium configured to store communication software that allows the first base to communicate with the second base through the first communication transceiver;
   a first processor communicatively coupled to the storage medium and to the first line interface, the processor configured to run the communication software and to receive an incoming communication through the first line interface and send an outgoing communication through the first line interface;
   a first user functionality;
   wherein the first base makes the first user functionality available to the second base over the base-to-base communication link for use by a user of the second base, and wherein the first base is configured to receive a communication from the second base over the base-to-base communication link indicating that the second base has received an incoming communication from the second network line interfaced to the second base through the second line interface contained in the second base, and wherein the first base will communicate the presence of the incoming communication to the second base to a first handset associated with the first base.

2. The communication device of claim 1, wherein the first base further comprises a speaker and a microphone, and wherein the first processor is configured to generate an audio drive signal from the incoming communication and couple the drive signal to the speaker to generate the outgoing communication from a voice signal received from the microphone.

3. The communication device of claim 1, wherein the first communication transceiver is a Radio Frequency (RF) transceiver.

4. The communication device of claim 3, wherein the RF transceiver operates in the 900 Mhz-ISM band or the 1.2 GHz-ISM band.

5. The communication device of claim 4, wherein the storage medium is further configured to store radio control software, and wherein the first processor is further configured to control the operation of the RF transceiver in accordance with the radio control software.

6. The communication device of claim 1, wherein the base-to-base communication link is a phone line home network link or a power line home network link.

7. A communication system comprising a first base, a second base and a first handset,
   the first base including:
      a first line interface configured to receive incoming communications over a first network line and to send outgoing communications over the first network line;
      a first communication transceiver configured to interface the first base over a base-to-base communication link to the second base;
      a storage medium configured to store communication software that allows the first base to communicate with the second base through the first communication transceiver;
      a first processor communicatively coupled to the storage medium and to the first line interface, the processor configured to run the communication software and to receive an incoming communication through the first line interface and send an outgoing communication through the first line interface;
      a first user functionality;
      wherein the first base makes the first user functionality available to the second base over the base-to-base communication link for use by a user of the second base; and
   the first handset including:
      a speaker configured to receive an audio drive signal;
      a microphone configured to generate a voice signal;
      a first RF communication transceiver configured to generate an incoming RF signal over a RF communication channel and to transmit an outgoing RF signal over the RF communication channel; and
      a second processor coupled to the speaker, the microphone, and the first RF transceiver, the processor configured to generate the outgoing RF signal from the voice signal and to generate the audio drive signal from the incoming RF signal, wherein the first base further comprises a second RF communication transceiver, the second RF transceiver configured to transmit the incoming RF signal to the first RF transceiver over the RF communication channel and to receive the outgoing RF signal from the first RF transceiver over the RF communication channel.

8. The communication device of claim 7, wherein the first processor is coupled to the second RF transceiver, and wherein the first processor is configured to generate the outgoing communication from the outgoing RF signal received by the second RF transceiver and to generate the incoming RF signal from the incoming communication received through the line interface.

9. The communication device of claim 7, wherein the first handset is configured to perform handset-to-handset communication with a second handset in the same in-home network.

10. The communication device of claim 9, wherein the first handset accomplishes handset-to-handset communication using the first RF transceiver to communicate directly with the second handset over a RF communication link.

11. The communication device of claim 7, wherein the first handset is configured to enter a sleep mode for a specified sleep period to conserve power, and wherein the first handset is configured to wake up after the sleep period, establish communication with the first base over the RF communication channel, and then re-enter sleep mode if the first base does not have an incoming communication from the network line.

12. The communication device of claim 7, wherein the first base is configured to hand the first handset off to a second base in the same in-home network, when the first handset is closer to the second base.

13. The communication device of claim 7, wherein the RF communication channel is in the 900 MHz-ISM band.

14. The communication device of claim 7, wherein the first handset further comprises a set of switches or keys for selecting one of the first and the second network line that the first handset is to be connected to in order to place an outgoing communication.

15. A communication system comprising a first base and a second base, the first base including:
   a first line interface configured to receive incoming communications over a first network line and to send outgoing communications over the first network line;
   a first communication transceiver configured to interface the first base over a base-to-base communication link to the second base;
   a storage medium configured to store communication software that allows the first base to communicate with the second base through the first communication transceiver;
   a first processor communicatively coupled to the storage medium and to the first line interface, the processor configured to run the communication software and to receive an incoming communication through the first line interface and send an outgoing communication through the first line interface;
   a first user functionality;
   wherein the first base makes the first user functionality available to the second base over the base-to-base communication link for use by a user of the second base, and wherein the storage medium is configured to store messages from unanswered incoming communications.

16. The communication system of claim 1, wherein the first base is configured to communicate the presence of an incoming communication over the base-to-base communication link to a second base in the same in-home network, and wherein the second base will communicate the presence of the incoming communication to a second handset associated with the second base, causing the second handset to activate an incoming communication indicator included in the second handset.

17. The communication system of claim 16, wherein the first base will negotiate with the second base in order to connect the second handset to the first line interface in the first base so that the second handset can receive the incoming communication.

18. The communication system of claim 1, wherein the first base is configured to negotiate with the second base in order to interface the first handset to the line interface included in the second base so that the first handset can receive the incoming communication.

19. A communication system comprising a first base and a second base, the first base including:
   a first line interface configured to receive incoming communications over a first network line and to send outgoing communications over the first network line;
   a first communication transceiver configured to interface the first base over a base-to-base communication link to the second base;
   a storage medium configured to store communication software that allows the first base to communicate with the second base through the first communication transceiver;
   a first processor communicatively coupled to the storage medium and to the first line interface, the processor configured to run the communication software and to receive an incoming communication through the first line interface and send an outgoing communication through the first line interface;
   a first user functionality;
   wherein the first base makes the first user functionality available to the second base over the base-to-base communication link for use by a user of the second base, and wherein the user functionality is a voice recognition functionality in the first base, and wherein the first base makes the voice recognition functionality available to the second base over the base-to-base communication link for use by a user of the second base.

20. A communication system comprising a first base and a second base, the first base including:
   a first line interface configured to receive incoming communications over a first network line and to send outgoing communications over the first network line;
   a first communication transceiver configured to interface the first base over a base-to-base communication link to the second base;
   a storage medium configured to store communication software that allows the first base to communicate with the second base through the first communication transceiver;
   a first processor communicatively coupled to the storage medium and to the first line interface, the processor configured to run the communication software and to receive an incoming communication through the first line interface and send an outgoing communication through the first line interface;
   a first user functionality;
   wherein the first base makes the first user functionality available to the second base over the base-to-base communication link for use by a user of the second base, and wherein the user functionality is an answering machine functionality in the first base, and wherein the first base makes the answering machine functionality available to the second base over the base-to-base communication link for use by a user of the second base.

21. A communication system comprising a first base and a second base, the first base including:
   a first line interface configured to receive incoming communications over a first network line and to send outgoing communications over the first network line;
   a first communication transceiver configured to interface the first base over a base-to-base communication link to the second base;
   a storage medium configured to store communication software that allows the first base to communicate with the second base through the first communication transceiver;
   a first processor communicatively coupled to the storage medium and to the first line interface, the processor configured to run the communication software and to receive an incoming communication through the first line interface and send an outgoing communication through the first line interface;

a first user functionality;

wherein the first base makes the first user functionality available to the second base over the base-to-base communication link for use by a user of the second base, and wherein the user functionality is a caller identification functionality in the first base, and wherein the first base makes the caller identification functionality available to the second base over the base-to-base communication link for use by a user of the second base.

* * * * *